United States Patent [19]

Munger

[11] 4,136,144

[45] Jan. 23, 1979

[54] ARROW VANE AND METHOD FOR THE PREPARATION THEREOF

[75] Inventor: Richard R. Munger, Charlotte, Mich.

[73] Assignee: MW Industries, Inc., Potterville, Mich.

[21] Appl. No.: 878,680

[22] Filed: Feb. 17, 1978

Related U.S. Application Data

[63] Continuation of Ser. No. 714,091, Aug. 13, 1976, abandoned.

[51] Int. Cl.² .............................. B29F 1/00; B29F 1/14
[52] U.S. Cl. .................................... 264/161; 264/163; 264/236; 264/297; 264/328; 264/337; 264/347
[58] Field of Search ................. 273/106.5 C; 264/161, 264/163, 231, 236, 297, 328, 347, 337

[56] References Cited

U.S. PATENT DOCUMENTS

| 3,457,234 | 7/1969 | Giantsio | 264/236 X |
| 3,749,403 | 7/1973 | Austin | 273/106.5 C |
| 3,767,753 | 10/1973 | Suzuki | 264/328 X |
| 3,815,916 | 6/1974 | Meszaros | 273/106.5 C |
| 3,875,280 | 4/1975 | Story | 264/92 |

*Primary Examiner*—Thomas P. Pavelko
*Attorney, Agent, or Firm*—Ian C. McLeod

[57] ABSTRACT

An elastomeric polyurethane polymer arrow vane with a tapered fletch which will not wrinkle or warp when attached to an arrow shaft is described. The vane is prepared by injection molding in mold cavities with a reverse curve in the portion of the cavities which form the base of the vane which attaches to the arrow shaft so that the vane is straight or has a reverse curve after it is injection molded.

8 Claims, 6 Drawing Figures

| PROVIDING MATING INJECTION MOLDS WITH CAVITIES DEFINING THE SHAPE OF THE VANE TO BE MOLDED EXCEPT THAT THERE IS A REVERSE CURVE TOWARDS THE FLETCH IN THE CAVITIES FOR THE VANE BASE | STEP 1 |

| INJECTION MOLDING A POLYURETHANE ELASTOMER AT LESS THAN 10 000 PSI TO FORM THE VANE | STEP 2 |

| EJECTING THE VANE FROM THE MOLD AND TRIMMING EXCESS POLYMER | STEP 3 |

| CURING THE VANE ON A FLAT SURFACE, THEREBY FORMING A VANE WHICH WILL NOT WRINKLE WHEN ATTACHED TO AN ARROW SHAFT | STEP 4 |

| | |
|---|---|
| PROVIDING MATING INJECTION MOLDS WITH CAVITIES DEFINING THE SHAPE OF THE VANE TO BE MOLDED EXCEPT THAT THERE IS A REVERSE CURVE TOWARDS THE FLETCH IN THE CAVITIES FOR THE VANE BASE | STEP 1 |
| INJECTION MOLDING A POLYURETHANE ELASTOMER AT LESS THAN 10 000 PSI TO FORM THE VANE | STEP 2 |
| EJECTING THE VANE FROM THE MOLD AND TRIMMING EXCESS POLYMER | STEP 3 |
| CURING THE VANE ON A FLAT SURFACE, THEREBY FORMING A VANE WHICH WILL NOT WRINKLE WHEN ATTACHED TO AN ARROW SHAFT | STEP 4 |

FIG. 1

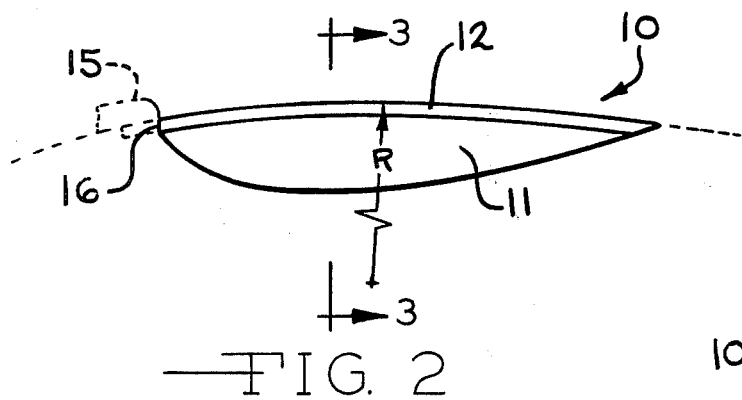

FIG. 2

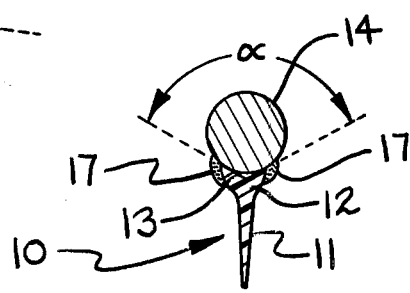

FIG. 3

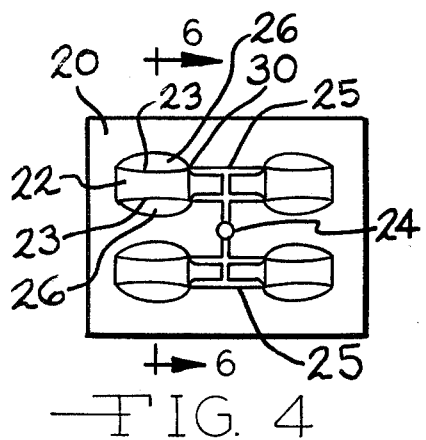

FIG. 4

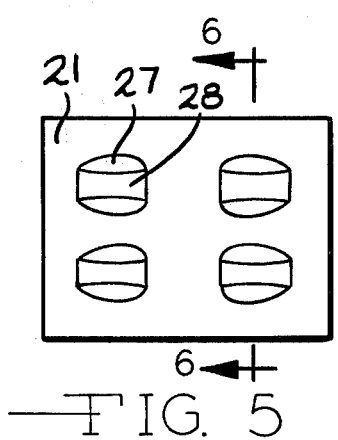

FIG. 5

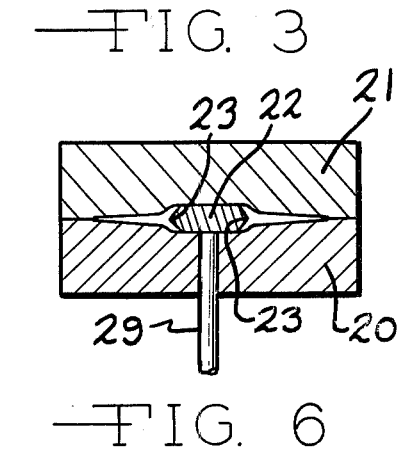

FIG. 6

ARROW VANE AND METHOD FOR THE PREPARATION THEREOF

This is a continuation division of application Ser. No. 714,091, filed Aug. 13, 1976, now abandoned.

BACKGROUND OF THE INVENTION

The present invention relates to an elastomeric polyurethane polymer arrow vane. In particular, the present invention relates to an arrow vane with a tapered fletch produced in a manner which gives it true flight characteristics because of freedom from wrinkles in the fletch.

The elastomeric polyurethane polymers have very desirable flexibility which make them an ideal material for use in arrow vanes. In order to form vanes from these polymers, the prior art has extruded a ribbon which forms a V shaped base with a flat, uniform rectangular cross-sectioned extension from the point of the V. After extrusion, the vanes are die-cut from the ribbon which forms the conventional curved fletch from the extension.

There are problems with die-cut vanes. First, the fletch is relatively thick at its outer edge opposite the base, second there is non-uniformity of the fletch and base because of the extrusion and cutting and third the vane surfaces are shiney which can frighten game if reflected in the sunlight.

Injection molding is a desirable and less expensive means of forming the vanes since a thin taper can be imparted to the fletch. Second, the mold surfaces can be treated to have minute projections which mat the surfaces of the vane. Third the vanes are very uniform. The problem with injection molding is that the base curves in the direction top of the V corresponding to the outer curvature of the fletch after removal from the mold due to stresses from molding. This produces wrinkling or warping of the fletch when it is attached to the arrow shaft. The result is most evident when a single molding gate leading into the base of the fletch is used, which is the easiest, most economical and reproducible method of producing vanes which are well formed.

It is therefore an object of the present invention to provide an elastomeric polyurethane polymer vane which will not warp or wrinkle when attached to the arrow shaft. It is also an object of the present invention to provide a method for producing the vanes which is simple, economical and reproducible. These and other objects will become increasingly apparent by reference to the following description and the drawings.

IN THE DRAWINGS

FIG. 1 is a schematic diagram of the steps of the method of the present invention.

FIG. 2 is a front view of an arrow vane of the present invention, particularly illustrating a reverse curve with a radius R in the base in an exaggerated manner.

FIG. 3 is an end cross-sectional view of the vane of FIG. 2 particularly illustrating the tapered fletch of the vane.

FIGS. 4 and 5 are plan views of the mating injection molds for forming the vanes particularly illustrating the single gates leading to the cavities for the bases of the vanes.

FIG. 6 is an end cross-sectional view of the mated molds shown in FIGS. 4 and 5 particularly illustrating the vane ejection plate which also serves as part of the mold cavities.

GENERAL DESCRIPTION OF THE INVENTION

The present invention relates to an improvement in a vane for arrow shafts molded of a thermoplastic elastomeric polyurethane including a fletch projecting from the point of a V shaped base with an obtuse inside V angle which attaches to the arrow shaft, which comprises: a base which as molded has a slight reverse curve with a radius towards the point of the V; and a fletch which has a cross-section which tapers from the point of the V to the edge of the fletch and has a matted dull surface wherein the vane when attached to an arrow shaft is free from surface wrinkles on the fletch. The method is generally set forth in FIG. 1. In particular, the invention relates to the method of injection molding a vane for arrow shafts of a thermoplastic elastomeric polyurethane polymer wherein the vane includes a fletch projecting from the point of a V shaped base with an obtuse inside V angle which attaches to the arrow shaft which comprises: providing mating injection molds with cavities defining the shape of the vane to be molded except that there is a reverse curve in the cavities for the base with a radius towards the point of the V and with a single gate into the cavity at one end of the base; injection molding the polymer into the mated mold cavities through the gate at elevated temperatures such that the plastic is moldable and at a pressure of less than about 10,000 pounds per square inch (about 703 kg/sq cm), wherein the mold is at an elevated temperature less than the thermoplastic point of the polymer and wherein the vane is held in the mold until the plastic solidifies, ejecting the vane from the mold and trimming the polymer at the gate, wherein the reverse curve of the base decreases after the vane cools; and curing the vane on a flat surface at room temperature for a period of time sufficient to prevent permanent deformation during storage, thereby forming a vane wherein the fletch does not wrinkle when the vane is attached to an arrow shaft.

Referring to FIGS. 2 and 3, the arrow vane 10 of the present invention is illustrated. The vane 10 includes a fletch 11 and a "V" shaped base or rib 12. A "V" 13 is provided in the base 12 for attachment to the arrow shaft 14 (FIG. 3). After it is formed, the base 12 is straight or has a slight reverse curve R towards the fletch 11. When the vane 10 is placed in a jig (not shown) to hold it to the arrow shaft 14 during gluing 17, the base 12 is straightened and leaves the fletch 11 wrinkle-free. The V surface 13 preferably has an angle alpha of between about 110° and 150° so that the base 12 has good contact with the arrow shaft 14 for gluing. Gate polymer 15 (shown in broken lines) is cut from the base 12 at one end 16 after the vane 10 is formed.

Injectable polyurethane thermoplastic polymer elastomers are well known to those skilled in the art. Polyester polyurethanes are preferred. Injectable polyurethanes are commercially available and are suitable if they can be heated to about 375° F. to 430° F. (190° C. to 221° C.) and can be molded at between about 3,000 psi (211 kg/sq cm) to less than 10,000 psi (703 kg/sq cm) at the injection molding machine nozzle (not shown). It has been found that higher injection pressures induce stresses in the polymer which result in a severe forward curvature of the base 12 (towards the top of the V) and cannot be used because of the resultant wrinkling of the fletch 11.

Referring to FIGS. 4 to 6, the injection molds 20 and 21 are illustrated. Ejection of the vanes 10 is preferably accomplished by means of a plate 22 having a "V" shaped edge 23 along two opposing edges which forms the "V" 13 in the vane 10. These edges 23 have an arc which is the radius of a circle of between 7 and 12 feet (2.13 to 3.65 meters). There can be a rise of between 0.015" (0.038 cm) and 0.035" (0.089 cm) from a straight line drawn between the ends of the "V" 13 in the base 12 (not shown). A sprue hole 24 is provided in the mold 20. Runners 25 lead to cavities 26 in the mold 20 through the gate 30. The other mold 21 is provided with cavities 27 and 28 for the vane 10 and for the plate 22 respectively. An ejection pin 29 is provided in the mold 20 attached to the plate 22 for lifting the plate 22 to eject the vanes 10 from the cavity 26 after the mold 21 is separated from the mold 20. The surfaces of the cavities 26 and 27 are roughened by abrading them or by hard coating them with chrome.

In operation, the molds 20 and 21 are fitted into a conventional screw type injection molding machine which is preferred in order to provide uniform blending with polymer coloring agents. Pellets of the elastomer are usually mixed with about one-quarter percent (¼%) or less of a standard urethane coloring agent and thus initially the mixture is not homogeneous. It has been found that for injection pressures of less than 10,000 psi, no more than the one-quarter percent can be used. Conventional injection molding of the vanes, with the molds heated to about 80° F. to 100° F. (26.7° C. to 37.8° C.), can then be accomplished. The molds 20 and 21 are opened, the ejection plate 22 lifts the vanes 10 from the cavities 26, they are stripped from the edge 23 of the plate 22 and the plastic sprue 15 is clipped from one end 16 of the base 12 at the gate 30. The vane 10 is then allowed to cure, usually for three or more days, on a flat surface so that the vane 10 will not permanently set in a distorted position during packaging, shipping and storage.

SPECIFIC DESCRIPTION

A CPR Pellethane$_{t.m.}$ 2102-80 A polymer (Upjohn Company, Kalamazoo, Michigan), in pellets (about one-eighth inch in diameter blended with one-quarter percent of a standard polyurethane coloring agent was used. A screw type New Britain$_{t.m.}$ 75 ton per square inch (118 kg/sq millimeter), 4 ounce (113.36 gm) mold capacity injection molding machine was used. The mold cavities were plated with unpolished hard chrome. The mold ejection plates had a "V" edge with a 3° arc which has a radius of 10.5 feet (3.2 meters) and there were eight (8) half cavities in the molds to produce eight (8) vanes.

The polymer injection temperature was set at 415° F. to 425° F. (212° C. to 218° C.) and the pressure was 8,000 psi (562 kg/sq cm) at the nozzle. The mold halves were closed and the polymer was injected into the molds which were at a temperature of 90° F. (32.2° C.) and held for 25 seconds in the mold to insure that the polymer had set sufficiently for handling. The molds were opened, the vanes on the runners were ejected from the cavities on the ejection plates. The vanes with the runners were removed and the runners were clipped at the gate points. The vanes were then laid on a flat paper covered surface for three (3) days which cured the polymer sufficiently for packaging. The vanes produced had a dull surface finish, a tapered fletch and an approximately straight base. The base lengths were 4 inches (10.1 cm) and 5 inches (12.7 cm) with a base thickness of 0.096 inch (0.24 cm) and a base V angle of 140°. The width of the fletch and the V was about 0.538 inch (1.37 cm) at its maximum. The taper goes from 0.023 inch (0.058 cm) at the base to 0.013 inch (0.033 cm) at the tip of the fletch. The vanes attached to the arrow shaft without any warping of the fletch.

As can be seen, the method of the present invention provides a relatively inexpensive and rapid method for producing the vanes in large numbers. This is a distinct manufacturing advantage since the vanes are used in very large numbers.

I claim:
1. The method of injection molding a vane for arrow shafts of a thermoplastic elastomeric polyurethane polymer wherein the vane includes a solid fletch defined by a curved outer edge and projecting from the point of a V shaped base with an obtuse inside V angle which attaches to the arrow shaft, the fletch having a cross-section which tapers away from the point of the V towards the edge of the fletch such that the fletch can wrinkle if the base is formed straight in molding which comprises:

(a) providing mating injection molds with cavities having roughened surfaces defining the shape of the vane to be molded except that there is a reverse curve in the cavities for the base with a radius towards the point of the V and with a single gate into the cavity at one end of the base;

(b) injection molding the polymer into the mated mold cavities through the gate at elevated temperatures such that the plastic is molded at a pressure of less than about 10,000 pounds per square inch, wherein the mold is at an elevated temperature less than a temperature at which the polymer is thermoplastic and wherein the vane is held in the mold until the plastic solidifies;

(c) ejecting the vane from the mold and trimming the polymer at the gate wherein the reverse curve in the base decreases after the vane cools; and (d) curing the vane on a flat surface at room temperature for a period of time sufficient to prevent permanent deformation during storage, thereby forming a vane wherein the fletch does not wrinkle when the vane is attached to an arrow shaft due to the molded reverse curve in the base.

2. The method of claim 1 wherein the reverse curve has a radius between about 7 and 12 feet.

3. The method of claim 1 wherein the injection molding is at a temperature of between about 375° F. to 430° F. at an injection pressure of 3000 to 9000 psi and at a mold temperature of about 80 to 100° F.

4. The method of claim 1 wherein vanes are cured for at least about three days on the flat surface.

5. The method of claim 1 wherein the inside V angle on the base of the vane is formed on the edge of an ejection plate in the mold having the corresponding curvature.

6. The method of claim 5 wherein two inside V angles on the bases are formed simultaneously on opposing edges of the ejection plate.

7. The method of claim 1 wherein the polymer resides in the mold for at least about 25 seconds.

8. The method of forming by molding an arrow vane with a base which attaches to the arrow and with a solid fletch defined by a curved outer edge projecting from the base, the fletch having a cross-section which tapers away from the base to the edge of the fletch such that the fletch can wrinkle if the base is formed straight in molding which comprises:

(a) providing mating injection molds with cavities having roughened surfaces defining the shape of the vanes to be molded except that there is a reverse curve towards the fletch in the cavities for the vane base;
(b) injection molding an elastomeric polyurethane polymer at less than 10,000 psi to form the vane;
(c) ejecting the vane from the mold and trimming excess polymer wherein the reverse curve in the base decreases after the vane cools; and
(d) curing the vane on a flat surface thereby forming a vane whch will not wrinkle when attached to an arrow shaft due to the molded reverse curve in the base.

* * * * *